United States Patent [19]

Gerchman et al.

[11] 4,441,157

[45] Apr. 3, 1984

[54] TEST UNIT FOR AIRCRAFT FUEL GAGING SYSTEM

[75] Inventors: Robert D. Gerchman, New Brighton; Ronald L. Newport, Fridley; Martin J. van Dyke, Minneapolis, all of Minn.

[73] Assignee: Honeywell, Inc., Minneapolis, Minn.

[21] Appl. No.: 321,199

[22] Filed: Nov. 13, 1981

[51] Int. Cl.³ .............................................. G06G 7/50
[52] U.S. Cl. .................................... 364/551; 73/1 H; 364/509; 364/803
[58] Field of Search ............... 364/509, 550, 551, 803; 73/1 R

[56] References Cited

U.S. PATENT DOCUMENTS

| | | | |
|---|---|---|---|
| 4,258,422 | 3/1981 | Dougherty et al. | 364/442 |
| 4,301,512 | 11/1981 | Keith et al. | 364/801 |
| 4,337,638 | 7/1982 | Leonard et al. | 73/1 R |

*Primary Examiner*—Errol A. Krass
*Assistant Examiner*—Clifford L. Tager

*Attorney, Agent, or Firm*—Lawrence J. Marhoefer; Abin Medved; Wayne B. Easton

[57] ABSTRACT

The invention relates to a test unit for testing the operation and accuracy of a microcomputer controlled aircraft fuel gaging system or processor which involves a characterized liquid gaging system sensor and sensor apparatus for determining a depth of liquid in a tank at a particular location in the tank. The fuel gaging system sensor is the wetted length type capacitance probe. The test unit hereof performs tests on processors prior to their being installed in aircraft and operates to provide a real time simulation of capacitive probes which in effect replaces the aircraft tank and probes thereof in testing the processors. A single reference capacitor simulates by multiplexing the capacitances of the set of tank probes, which in operation are scanned in succession by the processor, to verify the proper operation of the processor. The simulation provides a static fuel level from zero to one hundred percent and in addition a dynamic fuel level may be represented wherein the fuel is being loaded into or out of the tank.

17 Claims, 4 Drawing Figures

TEST UNIT FOR AIRCRAFT FUEL GAGING SYSTEM

The invention relates to a test unit for testing the operation and accuracy of a microcomputer controlled aircraft fuel gaging system.

U.S. Patent application Ser. No. 149,772, filed May 14, 1980, now U.S. Pat. No. 4,355,363, discloses one type of such an aircraft fuel gaging system which the test unit herein has the capability of testing.

The fuel gaging system of application '722 operates primarily to measure the volume of a fuel in one or more tanks but is also equipped with means for measuring the density of the fuel so that the total weight of the fuel can be computed and subsequently used as the basis for certain control functions.

Although the fuel gaging system of application '722 discloses the invention thereof as being applied to three fuel tanks of an aircraft, and although all large aircraft have multiple fuel tanks, the test unit hereof is illustrated herein as providing the simulation of a single tank for testing a fuel gaging system of that type which in fact may and normally does have multiple tanks.

In the aircraft industry a basic sensor for measuring fuel volume is the wetted length type capacitance probe which assumes increasing capacitance values corresponding to increasing fuel wetted lengths of the probe. In the fuel gaging system of application '722 there is disclosed an arrangement in which a set of wetted length type capacitance probes are strategically arranged in a fuel tank. Depending on the tank geometry and the placement of each probe, each probe assumes particular capacitance values which relate directly to corresponding levels of fuel in the tank. Conversely, if the individual capacitance values are determined, the level of fuel and hence the volume may be conveniently calculated by the microcomputer of the fuel gaging system.

In the management of fuel requirements for an aircraft information about the weight of fuel load is more useful or meaningful than the volume thereof and hence the fuel gaging system of application '722 has means for calculating and displaying fuel weight data. The densities of fuels vary widely, however, and in the system of application '722 there is a fuel density probe or densitometer for each tank which senses or measures the fuel density and transmits back an electrical signal having a frequency which corresponds to the measured density.

Fuel density may vary generally between about 5.7 and 7.8 lbs/gallon and the system of application '722 has means for converting the analog density signals to binary data words and utilizing them for the fuel weight calculations.

The capacitance of a wetted length type of capacitance probe is affected by the dielectric constant of the fuel which in turn is dependent on several factors including the temperature of the fuel. As a further refinement in the fuel gaging system of application '722 each tank thereof is equipped with a dielectric sensor in the form of a capacitor, the capacitance of which when submerged in the fuel is an indicator of the dielectric constant of the fuel at the current temperature.

In the fuel gaging system of application '722 a multiplexing system is used wherein, in operation, an excitation current is sequentially directed through a number of probe lines to the capacitors in the fuel tank which include the set of wetted length type capacitance probes and the capacitance type dielectric sensor probe. The resulting current from each capacitor probe is analyzed and processed by the fuel gaging system. By way of example, a tank equipped with fifteen wetted length type probes and one dielectric type probe might be sequentially scanned in a third of a second and the subsequent processing of the resulting current signals and the storing of binary representations thereof serve as a basis for a determination of the volume and weight of the fuel in a tank immediately thereafter. In a three tank system the volume and weight status of the fuel in each tank might be updated once each second, for example.

The fuel gaging system of application '722 has the control unit part thereof mounted in the instrument bay of the aircraft and a set of probes mounted in each fuel tank of the aircraft. The system includes individual leads or lines connected respectively to the low impedance sides of the probes and a single return line connected in common to the high impedance sides of all of the probes of a particular set.

For convenience, the fuel gaging systems to be tested by the test unit hereof will at times be referred to hereinafter as the unit under test or by the acronym UUT.

The main connections between the test unit hereof and a UUT are a single set of the probe lines of the UUT as referred to above. Other essential connections are a set of taps to internal multiplexing lines of the UUT which operate multiplexer apparatus in the test unit. The multiplexing lines sequentially direct an excitation current from an excitation signal generator of the UUT to individual ones of the probe lines of the set of probe lines which in actual use extend to the probes in a fuel tank but for test purposes extend to the test unit. If there are a total of sixteen probes for a tank unit, the multiplexing thereof may be controlled by four control leads which receive the multiplexing code from the microcomputer of the UUT. A related control line for the test unit would be a line or tap from the enabling pin of the UUT excitation multiplexer IC chip for use in enabling a decoder of the multiplexing lines in the text unit.

A main object of the invention is to provide a new and improved test unit for testing the operation and accuracy of a microcomputer controlled aircraft fuel gaging system which provides real time simulation of the capacitance of each individual fuel probe during static fuel level conditions or dynamic conditions such as tank filling or tank draining operations.

Other objects and advantages of the invention will become apparent from the following specification, the appended claims and the attached drawings.

GENERAL DESCRIPTION OF TEST UNIT

Figure 1:
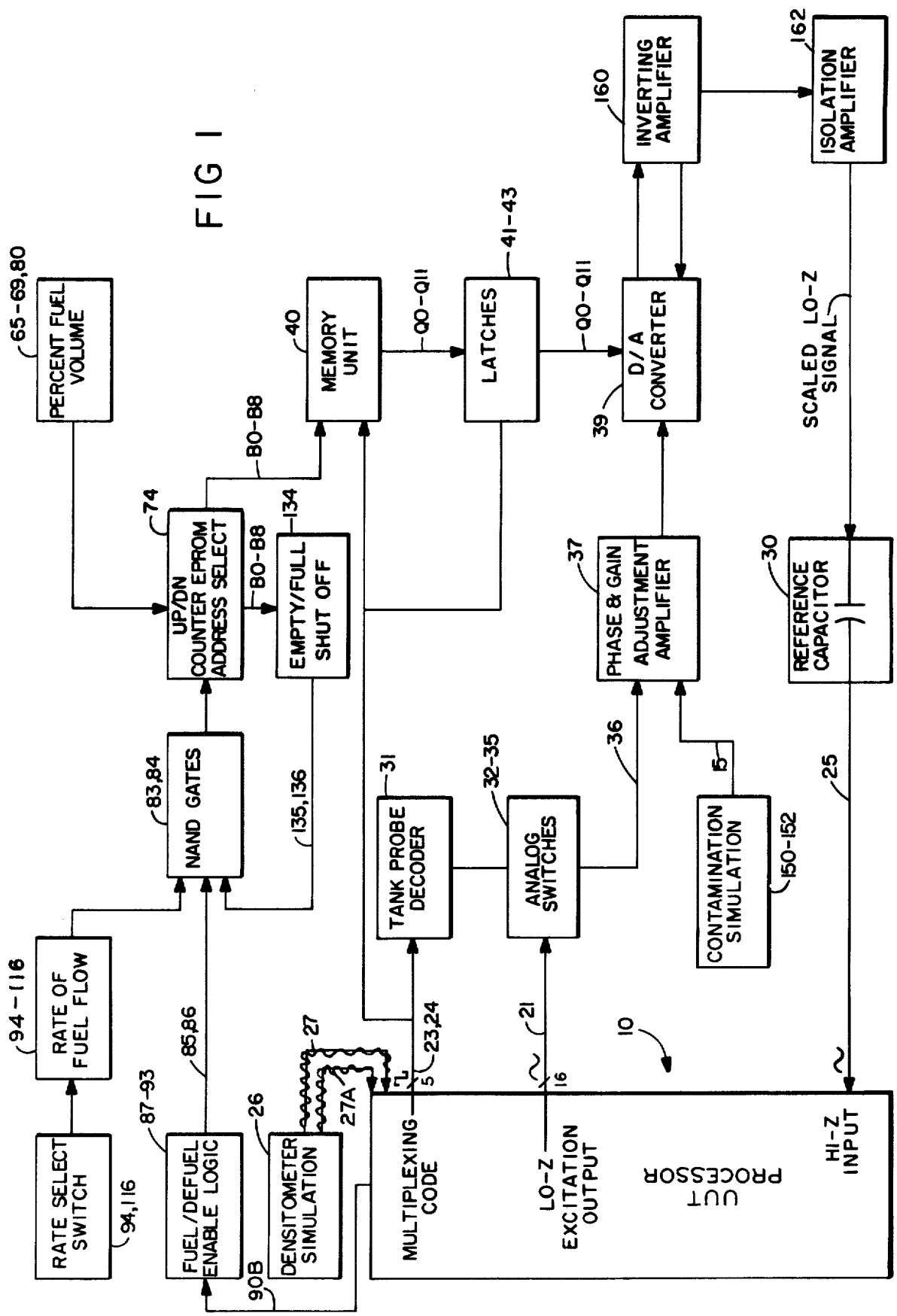
FIG. 1 is a block diagram of a test unit embodying the present invention shown connected to a liquid fuel gaging system (UUT) to be tested.
Figure 2:
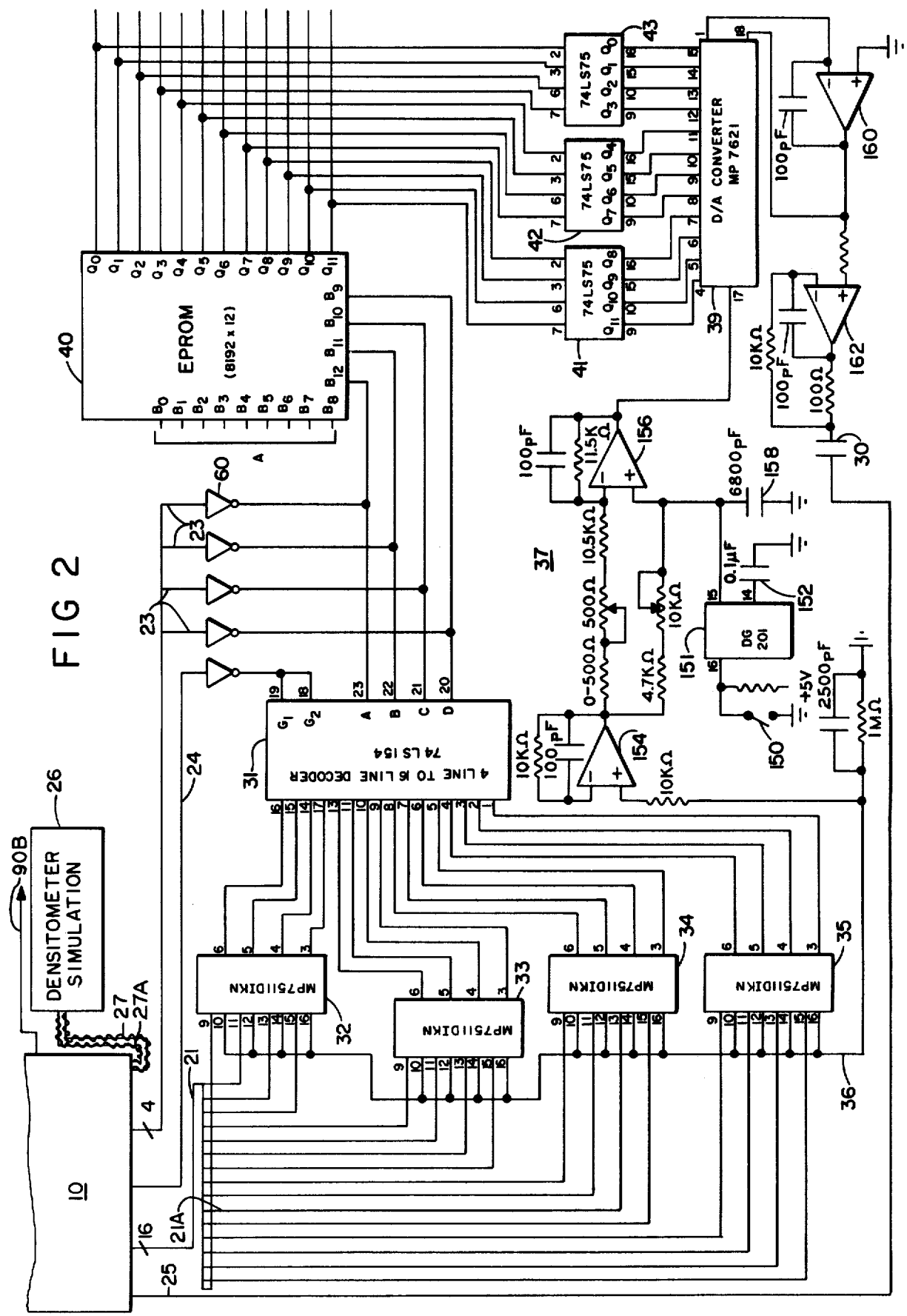
FIGS. 2 and 3 are schematic diagrams showing together the complete test unit hereof.
Figure 3:
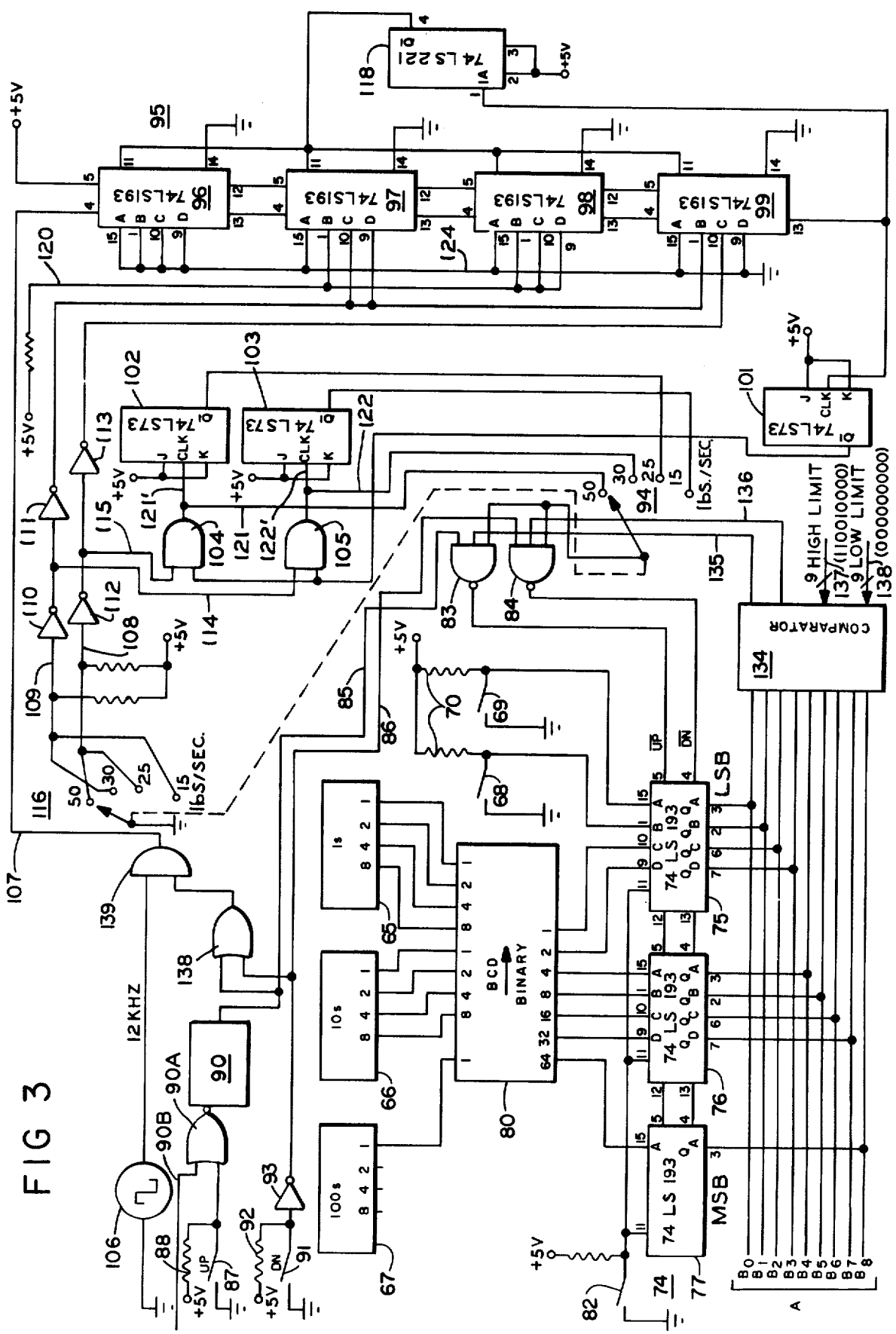

Referring to FIGS. 1 to 3 of the drawings, there is shown a unit 10 which represents an aircraft fuel gaging system or unit which is a unit-under-test (UUT) being tested by a testing unit embodying the invention hereof.

The UUT 10 is illustrated as having a group of sixteen probe lines 21 extending therefrom. When such a fuel gaging processor unit is installed in the instrument bay of an aircraft the group of lines 21 would extend to a single fuel tank fitted with capacitive sensors as described in application '722.

Of the sixteen sensors, one would be a capacitive type dielectric sensor and the others would be the long used wetted length type capacitive sensors. For convenience one of the lines, line 21A, will be designated as the dielectric sensor line although it is entirely arbitrary as to which line should be so designated.

Although the test unit hereof is applicable to any practical number of sensors, a group of sixteen sensors is illustrated herein because the number sixteen is a multiple binary number and from the standpoint of the explanation the use thereof allows an otherwise somewhat awkward arrangement to be thereby avoided.

In application '722 the wetted length capacitive sensors are mountable in a tank which, as a practical matter, is randomly shaped to make use of some generally untailored space in the aircraft which will accommodate the tank. In application '722 each wetted length capacitive sensor or probe has its wetted length measured individually and the individual measurements form the basis for calculations of the liquid volume and weight of fuel in the tank. These calculations are made in the system of application '722 by a microcomputer control unit having stored probe characterizing data in binary form based on (1) wetted probe lengths and the relationthereof to the effects of attitude, tank geometry, the number and location of the probes, (2) the dielectric of the fuel as measured by the single dielectric sensor and (3) the density of the fuel as measured by a densitometer in the tank.

In the fuel gaging unit of application '722 there is an excitation signal generator and a multiplexing unit which sequentially directs the generated excitation signals to the fifteen length or depth oriented capacitive sensors and the single capacitive type dielectric sensor. For convenience these sensors will sometimes be referred to hereafter as the depth probes and the dielectric probe.

Extending from the UUT 10 is a group of four lines 23 which are tapped into the control lines of the multiplexer unit of application '722 and thus carry the multiplexing code. A fifth line 24 extending from the UUT is associated with the four lines 23 and is a chip enabling line. A line 25 also extends from UUT 10 and this is a return line which returns an excitation signal processed by the test unit hereof to the UUT. Basic calculations made by the UUT 10 utilizing the current values it receives through return line 25 are in the form of volumes or gallons because the depth probes connected to lines 21 in an aircraft installation provide analog measurements of volume.

Of more interest in the operation of an aircraft, however, are the pounds of fuel in a tank or the rate at which the fuel tank is filled in terms of pounds per second. To facilitate this requirement, the fuel gaging system of an aircraft, i.e. the UUT 10, includes densitometer probe means installed in a fuel tank for sensing the density of fuel in the tank. Utilizing the sensed fuel density data the UUT calculates and outputs fuel quantity data in the form of pounds. Output data is updated frequently and an idea of the fill or drain rate may be noted from how fast the weight of the fuel in a tank changes.

The test unit hereof provides simulated fuel density data to the UUT with a densitometer simulation unit 26 which is connected to the UUT through two twisted pairs 27 and 27A. In a prototype model of the test unit a densitometer simulation unit 26 thereof was provided with means controllable by a thumb wheel switch which had square wave output signals directed to the UUT through line 27 corresponding to simulated fuel densities as follows:

| Density | Repetition Rate |
|---|---|
| 8.0602 lbs/gal | 5.304 kHz |
| 7.1477 lbs/gal | 5.676 kHz |
| 6.7775 lbs/gal | 5.856 kHz |
| 6.1032 lbs/gal | 6.134 kHz |
| 5.4813 lbs/gal | 6.424 kHz |

The density probe is not referred to herein in detail and it is believed sufficient to indicate that it operates to transmit two signals to the UUT, one of which on line 27A is a reference 10 kHz and the other on line 27 has a frequency such that the ratio of this frequency and the 10 kHz frequency corresponds to the sensed fuel density and that the UUT has means for converting this ratio to a digital data word which serves as a basis for fuel weight calculations by the UUT.

In the test unit hereof there is a multiplexing arrangement controlled by the incoming lines 23 and 24 which operates in synchronism with the above referred to multiplexer in the UUT and functions to sequentially direct signals from the probe lines 21 through internal circuits of the test unit.

As indicated above, the sixteen probe lines 21, in actual use in an aircraft, extend to a like number of probes in one of the fuel tanks of the aircraft. The test unit hereof, however, has only one single reference capacitor 30 to which the probe lines 21 are sequentially connected by a multiplexing circuit of the test unit. The reference capacitor 30 functions by the operation of the test unit to output a series of current values through return line 25 which simulate the individual current values produced by a set of capacitive type probes in a fuel tank. The probe lines 21 and the return line 25 in a fanciful sense do not allow the UUT to know or distinguish whether such lines are connected to a set of probes in a fuel tank or to the test unit hereof.

The excitation current in each of the probe lines 21 is sequentially directed by a 4 line to 16 line decoder 31 through quad analog switches 32 to 35 and phase and gain circuitry 37 to a D/A converter 39 which attenuates the current flowing through it to the reference capacitor 30. The D/A converter 39 is controlled by a memory unit 40 which is tied in to the multiplexing system of the test unit and is connected to the D/A converter through quad latches 41 to 43.

The test unit hereof has static and dynamic modes of operation. For the static mode, there are switches on the test unit control panel (not shown) which allow the operator to select for simulation a tank load from 0 to 100% in one-quarter percent increments. Memory unit 40 is addressable by the switches and is provided to facilitate the simulations.

A schematically shown IC chip 40 is an electrically programmable read only memory unit (EPROM) which is arbitrarily illustrated as having thirteen address pins B0 to B12 which provide a capacity of 8192 addressable words and twelve output pins Q0 to Q11 which provide for an output of twelve bit data words. A single IC chip 40, if manufactured, would be referred to as a 96K (8K×12) erasable prom.

In a prototype embodiment of the test unit the memory unit 40 actually comprises four 2732 EPROMS (4K×8) and three "2 line to 1 line" data selectors 74LS257 arranged in a known manner to output 12 bit data words from the four 2732 EPROMS which individually have only 8 bit word widths.

Figure 4:
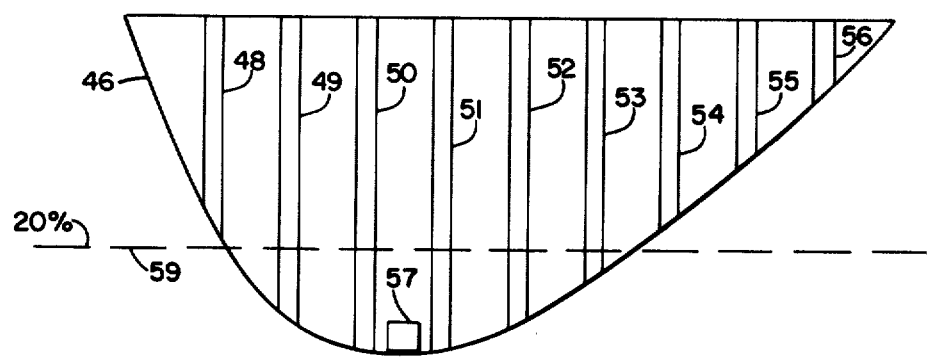
FIG. 4 is a schematic showing of a fuel tank equipped with probes for use in connection with an explanation of how binary data words are composed which facilitate the simulation of probe responses for different tank fill conditions.

Referring to FIG. 4 of the drawings, there is shown schematically a fuel tank and probe arrangement to facilitate an explanation of the operation of the test unit. An odd or irregularly shaped fuel tank 46 has installed therein wetted length type capacitive probes 48 to 56 and a dielectric capacitive probe 57. A dashed line 59 indicates, by way of example, a fuel volume level of twenty percent.

The memory unit 40 has a total capacity of 8192 twelve bit data words. If a probe system had a total of sixteen probes for one tank there would be a word space block available for each probe having a capacity of 512 characterizing date words. In the built prototype of the test unit the memory unit 40 was mapped to allow 401 words in each block for each probe which allowed for a zero to 100 percent depth level for each wetted length probe to be covered in one-quarter percent increments. The remaining 111 word spaces in each block were devoted to other functions of the test unit which are not of interest herein from the standpoint of the inventive concept.

The 111 extra words spaces in each block are conveniently available in practice for simulation of special static test conditions. Special data stored in those spaces can be readily accessed to provide simulations of different assumed dielectric constants, air mode variations involving different pitch and roll conditions, different flight attitudes and comparisons between flight and ground attitudes.

Reference capacitor 30 may be of any reasonable size equal to or larger than the largest of the sixteen probe capacitors to which the probe lines 21 would be connected to in an actual aircraft installation. The current returning to the UUT 10 through reference capacitor 30 and return line 25 at any one time represents the signal processing of an input signal in a particular one of the sixteen probe lines 21, including line 21A. The UUT 10 analyzes the current value in line 25 and, except in the case of dielectric probe line 21A, computes a fuel volume associated with a probe or simulated probe connected to one of the probe lines 21. An analysis of the current value of probe line 21A and a subsequent computation based thereon provides a value for the dielectric which is utilized in the above referred to fuel volume calculations.

The monitoring of the return line 25 in synchronism with the multiplexing code by the UUT allows summations by the UUT of individual fuel volume computations based on simulated depth probe data in memory unit 40 prepared to sequentially effect altering of the current flowing through the probe lines 21 to allow a total simulated fuel volume computation.

Concomitant with demultiplexing probe lines 21, the reference capacitor 30 must be made to simulate each of the probe capacitors of the particular UUT. Data is accordingly stored in memory unit 40 which corresponds to and precisely characterizes the actual probes utilized by the UUT 10.

Referring further to FIG. 4 it may be assumed by way of example that data for the ten probes 48 to 57 occupy ten of the sixteen word blocks of memory unit 40. As the output of memory unit 40 comprises 12 bit words, the D/A converter 39 (FIGS. 1 & 2) has a 12 bit input control comprising pins 4 to 15 thereof which permits a resolution of one part of 4095 which is about a 0.024 percent resolution. The attenuation afforded by the converter input control varies from full attenuation for a binary zero word 0000 0000 0000 to substantially zero attenuation 4095/4096 for a binary word 1111 1111 1111 which equals 4095 decimal. The output of converter 39 is directed to reference capacitor 30 through an amplifier 160 which converts the current output of converter 39 to a correspondence voltage which is applied to the reference capacitor 30 through a buffer amplifier 162.

The 12 bit data word Q0 to Q11 of memory unit 40 which controls D/A converter 39 is derived from (1) the electrical attributes and physical placements of the wetted length probes in a tank, (2) the electrical attributes of a dielectric probe in the tank, and (3) the spatial orientation of the tank due to aircraft attitude or a specifically assumed aircraft spatial orientation.

Assuming the memory unit 40 is to be programmed pursuant to the tank assembly of FIG. 4 it must first be assumed that the capacitance of the reference capacitor 30 is equal to or larger than the capacitance of the largest probe 50 when fully wet. In the example herein equality will be assumed.

Probe 50 may be considered the third probe of the sixteen involved and the third block of memory unit 40 may be used for the 401 characterizing data words used to simulate the probe at each quarter percent level. The inlet multiplexing lines 23 would for a period of about twenty milliseconds out of about a third of a second cycle read 0010 or two for pins B9 to B12 of memory unit 40 which would serve to access the third block of words for the simulation date for probe 50. By way of clarification the lines 23 would read 0000 for the first block for probe 48 and 0001 for the second block for probe 49, etc.

For the simulation of a twenty percent fuel volume content an operator would operate switches 65 to 69 on a control panel (not shown) which would correspond to the eighty-first word in the block which would be represented by the binary address 001010000 for the pins B0 to B8 of memory unit 40.

Before referring further to the addressing of memory unit 40, reference will be made to the matter of composing twelve bit data words therefor which are used for attenuating D/A converter 39 to simulate responses of the wetted length probes at different fuel levels and the dielectric probe at any level.

The response of a wetted length capacitance probe to an excitation signal is a current value which corresponds linearly to the unwetted capacitance of the probe plus a capacitance proportional to the wetted length of the probe.

The capacitance of a wetted length capacitor is of course dependent upon the dielectric constant of the fuel which may vary generally from about 1.966 to about 2.301. In an aircraft installation one of the UUT probe lines such as the line 21A transmits an excitation signal to a dielectric probe which modifies the excitation signal to impart thereto a current value corresponding to the capacitance of the dielectric probe in a fuel tank. This facilitates the UUT calculating the dielectric constant of the fuel and the capacitances of the wetted length probes which vary with changes of the dielectric constant.

In the test unit hereof a single assumed value such as 2.0 is choosen by way of example for the dielectric constant and appropriate data is assumed stored in memory unit 40 which facilitates modifying the excitation signal in line 21A to impart thereto a current value which corresponds to the assumed dielectric constant value.

Assuming the capacitance of the largest probe 50 equals 150 pF when dry, the capacitance will be 300 pF when fully wetted if a dielectric constant of 2.0 is assumed. This means that for the largest probe 50 the simulation should be, in one quarter percenter increments, between a current corresponding to 150 pF for empty and a current corresponding to 300 pF when full. When the UUT samples a simulated current for the largest probe 50 corresponding to a capacitance between 150 pF and 300 pF, it operates to determine or calculate a fuel level sensed by that probe.

In the above example and in the succeeding examples, the calculations must necessarily be based on a particular assumed value for the dielectric constant.

Referring to FIG. 4, the largest probe 50 at the twenty percent full level is wetted over 30.7 percent of the length thereof. This means that the capacitance of the probe 50 at that level would be 150 plus 0.307 times 150 (i.e. 300–150) or 196.05 pF. The attentuation required would be 196.05÷300 or 65.35%. In twelve bit binary the data word at the twenty percent full level for the largest probe 50 would be the twelve bit binary equivalent of 2677 or 101001110101.

Considering probe 52 as another example, its length is only nine-tenths of probe 50 and thus its fully wetted capacitance would be 0.9×300 or 270 pF. Assuming its dry capacitance to be 135 pF the entire wetting thereof would add 135 pF to the dry capacitance. At the twenty percent full level twenty-five percent of the probe is wetted which adds 33.75 pF to the 135 pF dry capacitance for a total of 168.75 pF. The attenuation required for the D/A converter 39 would be 168.75÷300 or 56.25%. In twelve bit binary the data word at the twenty percent full level for probe 52 would be the twelve bit binary equivalent 2304 or 100100000000.

Simulation of the dielectric constant probe 57 is based on the assumed value of the dielectric constant. One of the memory blocks of memory unit 40 contains the data for the assumed value and that value will be the same for each of the 401 data word spaces of the block. The binary data word for the dielectric constant will effect attenuation of the D/A converter 39 to the extent that the value of the current through reference capacitor 30 and return line 25 will correspond to the assumed dielectric constant value and the processing of this current by the UUT will result in determining the dielectric constant value and the fuel level calculations by the UUT will be based on this value.

Probes 48 and probes 54 to 56 would have relatively larger attenuation factors because they are substantially shorter than probes 50 and 52. Also at the 20% full level they are above the liquid level and thus contribute only their dry capacitance values to the D/A converter 39.

DETAILED DESCRIPTION OF TEST UNIT

Referring more in detail to the circuitry shown in FIG. 2, the multiplexing control lines 23 and the enabling line 24 extending from the UUT 10 are connected through inverters 60 as shown to a 4 line to 16 line decoder 31 which may be IC type 74LS154. As previously stated, lines 23 are tapped into multiplexing control lines inside of the UUT 10 and thus carry the same multiplexing code. Control lines 23 control the sequential connecting of the probe lines 21 to the D/A converter 39 and reference capacitor 30 of the test unit.

Decoder 31 decodes the four binary coded inputs of lines 23 into one of sixteen mutually exclusive outputs indicated by the pins 1 to 16 thereof. As the inputs of lines 23 change in accordance with the internal operation of the UUT 10, the decoder pins 1 to 16 are sequentially driven low in some order in dependence on the multiplexing code of the control lines 23.

The output pins of decoder 31 drive four quad SPST analog switches 32 to 35 which are IC type MP7511 DIKN. Each of the quad switches has input pins 3 to 6 which respectively control switch pairs designated by the pins 15-16, 13-14, 11-12 and 9-10. This type of switch unit has internal inverters such that a low level signal on any of the pins 3 to 6 thereof will effect closing of the switch corresponding thereto. It is thus a low signal on one of the pins 1 to 16 of decoder 31 that operates a corresponding switch of the switch units 32 to 35.

Quad switches 32 to 35 are operated to sequentially connect the sixteen probe lines 21 via a line 36 to D/A converter 39 in an order determined by the sequencing code of control lines 23.

Between quad switches 32 to 35 and D/A converter 39 is phase and gain adjustment circuitry 37 which will be discussed further on herein.

D/A converter 39 is a 12 bit multiplying unit IC type MP7621 with input pins 15 to 4 thereof corresponding to the range from LSB to MSB. Converter input pins 15 to 4 are connected respectively to the output pins Q0 to Q11 of memory unit 40 through three 4-bit bistable latches 41 to 43 which may be IC type 74LS75 units.

D/A converter 39 is wired for unipolar binary operation which provides an analog output at pin 1 of zero when the digital input is 0000 0000 0000 and an analog output at pin 1 of zero when the digital input is 0000 0000 0000 and an analog output at pin 1 of −0.9997 $V_{REF}$ when the digital input is 1111 1111 1111. $V_{REF}$ is the input signal at pin 17 of the converter.

The output pin 1 of D/A converter 39 is connected to the inverting input of an amplifier 160 for inverting the negative voltage output of the converter. The output of inverting amplifier 160 connects to reference capacitor 30 via isolation amplifier 162 and capacitor 30 in turn connects to the UUT 10 through return line 25.

Referring to FIG. 3, there is shown digital means which are manually settable to allow an operator to select a percentage fuel load simulation based on data stored in the memory unit 40. This is done by the operator selecting a percentage value from 0 to 100% in one-fourth percent increments which is translated into a partial address for the address pins B0 to B8 of memory unit 40.

The addressing means include three BCD thumb wheel switches 65, 66 and 67. Each thumb wheel is settable by an operator dialing in a decimal number from 0 to 9 and such decimal number is converted to a binary number from 0 to 9 at the output pins thereof. Switches 65, 66, 67 correspond respectively to the ones, tens and hundreds of operator selectable percentage values which in turn correspond to a simulated percentage fuel volume. Toggle switches 68 and 69 are used for one-half and one-quarter percent settings respectively and are biased by pull up resistors 70.

A counter unit 74 comprising three synchronous 4 bit up/down counters 75, 75 and 77, which may be IC type 74LS193 units, is provided which has a dynamic function in connection with simulating the filling and emptying of a fuel tank as will be explained further on herein. Counters 75 to 77 serve only as conduits to the memory unit 40 in connection with the simulation of a static fuel tank load, however, as will be seen.

Between thumb wheel switches 65 to 67 and the counters 75 and 77 is a schematically shown BCD to binary conversion unit 80. The conversion unit 80 is a schematically shown IC chip which is arbitrarily illustrated as having nine input pins for receiving inputs in BCD code form and seven output pins for outputting in the binary code form.

The fuel load volume is simulated in terms of percent of a full load and the desired percentage simulation is set by the thumb wheel switches 65 to 67 and the toggle switches 68 and 69. Thumb wheel switches 65 to 67 may receive settings from 0 to 100% in unit increments and switches 68 and 69 represent one-half and one-quarter increments respectively.

Assuming a twenty-five percent load simulation were desired in a particular test, the switches 57, 66, 65 would have the decimal numbers 025 applied thereto respectively by the thumb wheels thereof and the switches 68 and 69 would be closed. The output pins of switches 67, 66 and 65 and the input pins of conversion unit 80 would be 0 0010 0101 in BCD code. The output pins of conversion unit 80 would be 0011001 in binary and these would apply to the inputs of the counters 75 to 77 as shown. The toggle switches 68 and 69 are also to be considered and the binary input to the counters is actually 0011001.00.

The output pins of the counters 75 to 77 are connected to a set of lines B0 to B8 as shown which extend to the address pins B0 to B8 of memory unit 40. The input pins for these counters carry the binary equivalent of the simulated load set by the switches 65 to 69 and this binary value is transferred from the input pins of the counters to the output pins thereof by briefly bringing load pin 11 of the counters to a low state. A grounding push button momentary switch 82 biased with a pull up resistor is connected to the load pins 11 of the counters for this purpose. An operator thus sets the switches 65 to 69 for the percentage load simulation desired and, by briefly pushing switch 82, that setting is caused to be transferred in binary form to lines B0 to B8.

In a prototype of the test unit hereof the equivalent of the schematically illustrated conversion unit 80 comprised five IC type 74184 BCD to binary converters arranged in a known manner as illustrated on page 402 of the first edition of the TTL Data Book for Design Engineers, copyright 1973, by Texas Instruments Incorporated.

Referring again to FIG. 2 it may be recalled from above that memory unit 40 has sixteen blocks for storing data words for the sixteen probes. The 401 data words of each of fifteen blocks specify the level of fuel in a tank for the fifteen corresponding wetted length probes from 0 to 100 percent in one-quarter percent increments. The sixteenth block stores the data words for the dielectric probe which has an assumed dielectric constant and thus the defining data word for the dielectric probe is identical for each of the 401 word storage spaces in that block.

The address selection via switches 65 to 69 and pins B0 to B8 is directed to one of the 401 addresses in each of the sixteen blocks which corresponds to a particular tank level for each of the fifteen depth probes and a dielectric constant for the dielectric probe. Binary 80 would correspond to the twenty percent level, for example. The data word in each block at the selected address or level, such as the twenty percent level, is used to control the D/A converter 39.

The operation of the four multiplexing lines 23 in accordance with the multiplexing code causes sequentially accessing of the sixteen memory blocks through adress pins B9 to B12. If the twenty percent level is chosen by switches 65 to 69, the data word Q0 to Q11 at that level in each of the sixteen blocks will be sequentially accessed and output to the D/A converter 39 through latches 41 to 43.

In a practical unit each multiplexing cycle on lines 23 might be about one-third of a second and thus the access time for each probe simulation would be about twenty milliseconds.

Each data word Q0 to Q12 is thus used to control the D/A converter 39 and there are sixteen sequential probe readings in a third of a second for each selected level causing corresponding currents to flow through reference capacitor 30 and return line 25 to the UUT 10. Each succeeding current value in return line 25 corresponds to a volume quantity in gallons for a particular depth probe at a particular level, such volume quantity being determined as an intermediate calculation by the UUT. A final calculation by the UUT involves utilizing simulated fuel density data supplied to the UUT by the test unit via the densitometer simulation unit 26 to determine the pounds of fuel which would be in the fuel tank if the fuel level thereof were at the fuel level selected by the test unit switches 65 to 69.

The fuel quantity in pounds is then output by the UUT to some kind of display unit which would be on the control panel of the test unit. This data is of interest to the operator of the test unit as a verification of the simulated data to which the UUT is subjected.

The description thus far has related to the simulation of static conditions which involve selecting a fixed volume or fuel level for simulation.

Referring further to FIG. 3 there is also shown circuitry for simulating dynamic conditions wherein, subsequent to selecting a static fuel level percentage via thumb wheel switches 65 to 67 and toggle switches 68 and 69, a dynamic fuel filling or draining condition relative to the static reference level may be simulated.

The dynamic fuel rate circuitry is designed to simulate several fuel rate conditions. In the prototype test unit there were provided four fuel rate settings which were for 15, 25, 30 and 50 lbs/second.

In order to dynamically simulate the filling and draining of a fuel tank the counter unit 74 comprising the up/down counters 75 to 77 is utilized and operated in a manner to be described to sequentially, and at a selected rate, access addresses B0 to B8 of memory unit 40 in an up (fill) or down (drain) direction as desired from a starting address (simulated tank level) selected by the switches 65 to 69.

Counters 75 to 77 are cascaded as shown and the up/down control pins 5 and 4 of the first counter 75 are connected respectively to NAND gates 83 and 84. The pulse rate outputs of these NAND gates control the overall counting speed, up or down, of the counter unit 74.

The output pins 3, 2, 6 and 7 of an IC type 74LS193 counter range from LSB to MSB and the order in which they are connected to address lines B0 to B8, as shown, produce, as selected, up or down sequential binary addressing modes for the address lines B0 to B8 of memory unit 40.

In providing fill and drain simulations the operator first selects a simulated level from which the fill or drain will start by dialing in the desired starting level, in percent, via thumb wheel switches 65 to 67 and one-half and one-quarter fractions of a percent via toggle switches 68 and 69. As explained above with regard to the static mode of operation, this operation of the switches results in a selected binary value corresponding to 0 to 400 decimal on the input pins of the counter unit 74. In accordance with the characteristics of IC type 74LS193 counters a momentary change from low level to high level on pins 11 enabled by switch 82 causes the selected input binary value on the pins 15, 1, 10, 9 thereof (ABCD) to be present on the corresponding output pins 3, 2, 6, 7 thereof and thus also be preset on the address lines B0 to B8.

NAND gates 83 and 83 are connected respectively to the count up and count down pins 5 and 4 of counter unit 74 and thus control the simulated fill and drain conditions. An enabling control line 85 is connected to NAND gate 83 and indirectly to a two way, groundable switch 87 which is operated in connection with a pull up resistor 88 and a nor gate 90A so that when closed it enables NAND gate 83. A valve closing delay simulation unit is indicated by a box 90 in enabling line 85 and this will be discussed further on herein.

An enabling control line 86 is connected to NAND gate 84 and a two way, groundable switch 91 which is operated in connection with a pull up resistor 92 and an inverter 93 so that when closed it enables NAND gate 84.

It may be noted that NAND gates 83 and 84 have a common input switch 94 on two respective inputs thereof which may select inputs from lines labeled 30, 50, 25, and 15 pounds/second. This has to do with selecting the pulse rate for operating the counter unit 74, either up or down, from the preset level or value, but that aspect of the test unit will be referred to further on herein.

Referring to memory unit 40, it may be recalled from above that the mapping thereof comprises sixteen blocks for simulating sixteen probes and that the address pins B0 to B8 access 401 words of each block for each simulated probe. The memory unit address pins B9 to B12 are driven in accordance with the multiplexing code on input lines 23 and thus the sixteen probes are sequentially and cyclically accessed via pins B9 to B12 in accordance with the multiplexing code at whatever simulated fuel level corresponds to the address on pins B0 to B8.

In a practical unit each multiplexing cycle on the lines 23 and pins B9 to B12 might be about one-third of a second and thus the access time for each probe simulation would be about twenty milliseconds.

Assuming for the purpose of illustration that a fuel tank holds 40000 pounds of fuel at an assumed density of 6.9 lbs/gallon, a one-fourth percent increment of the 401 data words in each memory block would correspond roughly to 100 pounds of fuel. This means, for example, that for a 50 pound/second fill or drain rate the dwell time for each successive address B0 to B8 would be 2.0 seconds. Similarly, for a 30 pound/second drain of fill rate, the dwell time for each successive address would be 3.33 seconds.

Upon determining the rate at which an address B0 to B8 should be accessed for different desired simulated fill and drain rates, the next step in the design procedure would involve providing the outputs for NAND gates 83 and 84 with pulse rates which would drive the counter unit 74 at those rates.

The pulse rates for the following fill and drain rates were determined for the prototype test unit:

| Fill or Drain Rate | Pulse Rate |
|---|---|
| 50 lbs/sec | 1 pulse/2.0 seconds |
| 30 lbs/sec | 1 pulse/3.33 seconds |
| 25 lbs/sec | 1 pulse/4.0 seconds |
| 15 lbs/sec | 1 pulse/6.67 seconds |

Circuitry for providing the determined range of pulse rates for NAND gates 83 and 84 involves a fuel rate select timer unit 95 comprising four cascaded IC type 74LS193 synchronous binary 4 bit up/down counters 96 to 99. The operation of the timer unit 95 involves presetting or programming the counters 96 to 99 with a predetermined number related to the pulse rate desired for the inputs of the NAND gates 83 to 84, applying clock pulses to the count down pin 4 of counter 96, and allowing the predetermined number to be counted down to zero at which time a pulse appears on the borrow pin 13 of counter 99.

Between the borrow pin 13 of counter 99 and NAND gates 83 and 84 are three IC type 74LS73 JK flipflops 101 to 103 and two AND gates 104 and 105. Flipflops 101 to 103 are each wired in a toggle mode which causes each output thereof to change states for each pulse applied to the clock input thereof. With this arrangement each flipflop 101 to 103 is in effect a divide-by-two counter in that the output rate of each one is only one-half the pulse input rate on the clock input pin thereof.

A clock source 106 for applying counting pulses through a line 107 to the count down pin 4 of counter 96 had a pulse rate of 12kHz in the prototype test unit. If this pulse or clock rate is taken as a starting point, the time for counting down from the programmed binary number on pins A, B, C and D of counters 96 to 99 to zero, which is denoted by a pulse on the borrow pin 13 of counter 99, is dependent upon the value of the programmed number. If a count down time of 2.0 seconds corresponding to a fill or drain rate of 50 lbs/second is desired, the programmed number would be the binary equivalent of 2.0 times 12000 (i.e. 12 kHz) or 24,000. If a count down time of 3.33 seconds corresponding to a fill or drain time of 30 lbs/second is desired, the programmed number would be the binary equivalent of 3.33 times 12000 or 40000.

Borrow pin 13 of counter 99 connects to the clock pin of JK flipflop 101 which, as mentioned above, is wired in a toggle mode which causes the output $\bar{Q}$ thereof to change states for each clock pulse and thus in effect the $\bar{Q}$ output of flip-flop 101 is at half the pulse rate of the pin 13 of counter 99.

Circuitry for applying the binary equivalents of the above referred to programmed numbers (24,000 and 40,000) comprise, respectively, select lines 108 and 109, a five volt line 120 and a ground line 124, all of which extend to the inputs of timer units 95 as shown. Line 108 is selected by turning a switch 116 to a setting 50 or 25 thereof and line 109 is selected by turning switch 116 to a setting of 30 or 15 thereof, these settings having reference to selected fill or drain rates in pounds/second. Lines 109 and 108 have inverters 110 to 113 to facilitate the enabling of AND gates 105 and 104 in connection with and in dependence upon which of the lines 109 or 108 is selected for a particular load setting. A line 114 from between inverters 110 and 111 enable AND gate 105 when line 109 is selected. A line 115 from between inverters 112 and 113 enables AND gate 104 when line 108 is selected.

If line 108 is selected by switch settings 50 or 25, the circuitry associated with that line will cause the inputs of counters 96 to 99 to be programmed with the binary equivalent of the count down number which in this instance is one-half of 40000 or 20000 because of the dividing action of flip-flop 101. Line 109 is activated by switch settings of 30 or 15 and the circuitry associated with that line will cause the inputs of counters 96 to 99 to be programmed with the binary equivalent of the count down number 12000 which is half of the above referred to 24000.

Each time a programmed number is counted down to zero the borrow pulse appearing on pin 13 of counter 99 also pulses the input 1 of a reset chip 118 which is an IC type 74LS221 which comprises dual monostable multivibrators with Schmitt-Trigger inputs. When pin 2 of chip 118 is held high and pin 1 thereof receives a positive pulse, a negative pulse emits from pin 4 which is output $\bar{Q}$ thereof. Pin 4 is connected to the load lines 11 of counters 96 and 99 which function to load the programmed number at the data input pins of the counters while the load pins 11 thereof are low. Thus a negative pulse from pin 4 of chip 118 effects loading the programmed number into counters 96 to 99.

If the gang connected switches 94 and 116 have a 50 lbs/second setting the programmed number via line 108 for counter unit 95 will be the binary equivalent of 20000 and the pulse rate at the borrow pin 13 of counter 99 will be 1 pulse per 1.0 seconds. The dividing action of flipflop 101 will cause the pulse rate at the output thereof to be 1 pulse per 2.0 seconds and, upon being transmitted through AND gate 104, this output will via a line 121 appear on the 50 lbs/sec. pin of switch 94. Switch 94 places the pin 50 setting thereof on the inputs of both gates 83 and 84 and the select switch arrangement 87 or 91 enables one gate or the other to pulse the up or down control pins 5 or 4 of counter 75 depending on whether a fill (count up) or a drain (count down) operation is desired.

It may be noted that the condition of line 108 is the same for both the 25 and 50 lbs/second settings of switch 116 and that the condition of line 109 is the same for both the 15 and 30 lbs/second settings of switch 116. The pulse signal for the 25 lbs/second setting is derived via a line 121' from the output of AND gate 104 to the clock input of the JK flip-flop 102, the output of which provides the divided frequency for the 25 lbs/second setting. A somewhat analogous arrangement is provided for the 30 and 15 lbs/second settings wherein the output of AND gate 105 appears on the 30 lbs/second pin of switch 94 via a line 122 and the 15 lbs/second setting is derived via a line 122' from the output of AND gate 105 to the clock input of the JK flipflop 103, the output of which provides the divided frequency for the 15 lbs/second setting.

The counter unit 74 is operated to count up or down (fill or drain simulation) in accordance with the pulse rate applied to pins 5 or 4 of counter 75 from a reference level established by the initial setting of switches 65 to 69 as explained above. The counting range on lines B0 to B8 is from the reference setting to binary zero or the binary equivalent of the decimal 400 which is the fuel tank range from zero to 100 percent.

A comparator unit 134 has the input side thereof connected to lines B0 to B8 and has two output lines 135 and 136 connected respectively to NAND gates 83 and 84. Comparator unit 134 operates so that the output lines 135 and 136 enable gates 83 and 84 while the binary value of lines B0 to B8 is within limits higher than binary zero and lower than the binary equivalent of the decimal 400. The high and low comparator limits are input to the comparator via sets of lines 137 and 138. When B0 to B8 equals one or the other of the above referred to limits, line 135 or line 136 changes state and respectively causes a disabling of the corresponding NAND gate 83 or 84. This disabling of the corresponding gate cause the counter to stop and it will remain stopped until a new intermediate reference setting is provided for the lines B0 to B8 via the switches 65 to 69 and 82.

In the prototype test unit the comparator unit 134 comprises four IC type 74LS85 4-bit Magnitude Comparators and four 2 input NAND gates connected in a generally conventional manner to lines B0 to B8.

The counting operation of counter unit 74 produces sequentially changing binary values on lines B0 to B8 which in effect constitute changing accessing addresses for memory unit 40. As a gauge for the timing involved, a 50 lbs/second fill or drain setting corresponds to accessing a quarter per cent level for 2.0 seconds. During this time interval the multiplexing action of lines 23 cause the value of each of the sixteen probes to be accessed about every twenty milliseconds such that a reading for each probe is obtained about six times at each level during the 2.0 seconds time period. The data words corresponding to each probe at each quarter percent level controls the D/A converter 39 so that a different current value is transmitted to the UUT 10 through reference capacitor 30 and return line 25 every twenty milliseconds.

The UUT processes the volume data received through return line 25 along with assumed density data from the densitometer simulation unit 26 through line 27 and outputs or displays a value which designates the fuel in the tank in pounds. For static testing wherein the operator selects a percentage value with switches 65 to 69 he will note whether the UUT display in pounds corresponds to the percentage value he has selected. For a static simulation wherein the tank capacity would be 40000 pounds for an assumed density of 6.9 lbs/gal., a 40 percent simulation setting would result in a 16000 pounds display by the UUT if the UUT correctly processes the test data supplied by the UUT.

For dynamic testing wherein the operator selects a fill or drain setting of 15, 25, 30 or 50 lbs/second, the UUT will display a changing pounds value and the operator may evaluate the changing display with a watch to determine if the UUT display shows the tank quantity changing at a rate corresponding to the setting of the test unit. As a practical matter, however, the exact rate of filling or draining a tank is not too important but the opportunity for the operator to select different fill and drain rates gives him a better idea or feel for whether a UUT is properly processing the test data fed to it.

Reference is now made to the valve closing delay simulation unit 90 in enabling line 85 which is related to the fuel tank filling operation.

Aircraft fuel filling apparatus normally includes controls for selecting a predetermined number of gallons or pounds of fuel desired for the tank, means for sensing the reaching of the predetermined fill level, and actuating means responsive to the sensing means for closing the fuel pump valve when the predetermined limit is reached.

High volume fuel pumps which can pump on the order of thirty pounds of fuel per second necessarily have relatively large valves and such valves by reason of their size have relatively slow opening and closing times. An opening or closing time on the order of four seconds would not be unusual and thus when a high pumping rate is involved a considerable amount of fuel passes through a valve between the time it is subjected to an opening or closing signal and the time it actually is either fully opened or fully closed.

This valve opening and closing time is simulated by the valve opening and closing delay apparatus 90 which in the prototype test unit simulates a four second delay time. When NOR gate 90A at the input of box 90 inputs a one signal to box 90 after switch 87 is closed to start a filling simulation, the time delay circuit effects a four second starting delay. When a filling operation is to be simulated the operator first selects the starting level via switches 65 to 69 and 82. The switch 87 is then moved to the closed position to select the fill mode. The starting and time delay operations are facilitated by an OR gate 138 and an AND gate 139 which link the fill/drain selection switches 87 and 91 to the clock line 107. The closing of fill switch 87 causes the output of the delay unit 90 to go from low to high four seconds after switch 87 is closed and this serves to enable the counting AND gate 139 through the OR gate 138.

A line 90B normally extends from the UUT to a fuel inlet valve on the aircraft. When the UUT senses and determines a near full tank condition a 1 signal is output to the valve which, by its nature and characteristics closes about four seconds thereafter. In the test set-up the line 90B extends to NOR gate 90A. When the UUT senses a simulated near full tank condition a 1 signal is applied to line 90B which ANDS with the 1 signal at the output of inverter 89 to effect a 1 signal to box 90 to initiate a valve closing signal which occurs four seconds thereafter at the output of box 90. If switch 87 were opened manually prior to a closing signal appearing on line 90B, this would also constitute a fuel valve closing signal which would cause the output of delay unit 90 from high to low after a four second delay. In either case, whether the closing signal comes from the switch 87 or line 90B, the counting on line 107 continues by reason of AND gate 139 continuing to be enabled during the four second delay period.

When a drain operation is to be simulated the closing and the subsequent opening of switch 88 effects respective enabling and disabling of AND gate 139 without any time delay being involved.

In the prototype test unit the delay unit 90 comprised an IC type 555 timer triggered by an IC type 74LS221 having dual monostable multivibrators with Schmitt-trigger inputs and outputting to an IC type 74LS73 JK flipflop.

Referring to the circuitry 37 between the analog switch output line 36 and D/A converter 39, the functions of this circuitry are (1) to provide for phase and gain adjustments as will be described and (2) the simulation of contamination of the probes.

In the UUT the principle of operation in determining fuel depths and dielectric constants is based on comparing the magnitude of current changes caused by changes in the capacitances of capacitive type probes. In making comparisons of the relative magnitudes of compared currents the respective currents must be in phase or 180 degrees out of phase to facilitate meaningful comparisons.

Capacitive type probes and the reference capacitor 30 inherently cause phase angle shifts, however, and the circuitry 37 is accordingly provided to adjust the phase of the currents in return line 25 to be phase-wise compatible with the measurement circuitry of UUT 10.

The overall attenuation factors of the test unit must also be taken into account and the circuitry 37 also provides amplification to facilitate calibration with respect to the gain needed to compensate for such attenuation losses.

The circuitry 37 also provides for the simulation of probe contamination with a shunt network which comprises a pull up switch 150, an IC switch 151 and a capacitor 152. This shunt network will be referred to further on herein.

Circuitry 37, apart from the contamination shunt network, includes an isolation amplifier 154 and an amplifier 156 having associated resistance and capacitance components to facilitate the gain and phase change adjustments referred to above. Amplifiers 154 and 156 in the test unit are IC type LM118 op amps.

In the contamination shunt network of the prototype test unit the IC switch 151 is an IC type DG 201 quad monolithic SPST CMOS analog switch.

Referring in general to the contamination of capacitive type probes, a dirt or sludge contamination build-up across a capacitor has the electrical effect of an added resistance and thus has the effect of changing the phase angle across the capacitor. The simulation of dirt or sludge contamination is accomplished in the test unit by adding capacitance to the circuitry 37 and the resulting phase angle change is interpreted by the UUT as contamination.

In the circuitry 37 the "contamination" capacitance is added by closing switch 150 which activates pin 16 of IC switch 151 which shorts pins 14 and 15 to place capacitor 152 in parallel with capacitor 158 which has the effect of substantially increasing the shunt capacitance of the circuitry 37 and thus increase the phase angle thereof. In practice a phase change of about forty degrees would be satisfactory to simulate a substantial contaminating condition.

The effect of closing switch 150 is to add the same degree of capacitance to each multiplexed excitation signal which comes through conductor 36 and thus the UUT will interpret this simulation as a contamination simulation of all of the probes.

Referring to the circuitry on the downstream side of D/A converter 39, there is an inverting amplifier 160 connected to the output pin 1 of the D/A converter and an isolation amplifier 162 connected between amplifier 160 and the reference capacitor 30. The output of the inverting amplifier 160 is fed back to feedback pin 18 of the D/A converter to provide closed loop operation.

With this connection amplifier 160 converts the D/A converter current output to a voltage.

Amplifiers 160 and 162 in the prototype test unit were also IC type LM118 op amps as were amplifiers 154 and 156.

In operating the test unit hereof the first step is to start the UUT 10 to get multiplexing signals on the lines 23 and 24 and multiplexed excitation signals on the lines 21. If the test unit operator desires to simulate a fuel tank level for the UUT to verify, he determines that switches 87 and 91 are open and then dials in a percentage value on switches 67 to 69 between zero and 100 percent. Switch 82 is briefly closed so that the binary equivalent of the selected simulation value which is transmitted through converter 80 to counter unit 74 is set on the address lines B0 to B8 of memory unit 40.

Assuming there are fifteen depth probes and one dielectric probe, the depth level data Q0 to Q11 of each depth probe corresponding to the selected level will be accessed via multiplexing lines 23 connected to address pins B9 to B-12 and these values will be sequentially transmitted to the attenuating input pins 15 to 4 of D/A converter 39 which correspondingly attenuates each excitation signal sequentially appearing on lines 21 and at the input of D/A converter 39. Each successively attenuated excitation signal transmitted from converter 39 to reference capacitor 30 is appropriately transformed thereby to produce a relevant current value and the succession of such signals are returned to the UUT through line 25 where they are processed. Memory unit 40 has only one assumed value for the dielectric constant and line 21A which corresponds to the dielectric probe is thus processed so that return line 25 will transmit a current value which the UUT will convert to the assumed or simulated dielectric constant and use it in subsequent fuel level calculations.

Densitometer 26 continuously transmits an assumed fuel density value to the UUT and thus facilitates fuel calculations in pounds.

Although the operator simulates a fuel tank level in terms of percentages with switches 65 to 69, with the use of simple conversion tables he will be able to determine if the display of fuel tank contents in pounds correspond to the simulated percentage level dialed via switches 65 to 69. By way of example a display of 16000 pounds would correspond to a forty percent simulation setting for a fuel tank having a capacity of 40000 pounds at an assumed fuel density.

In simulating a fueling or defueling condition the operator will first select a simulated starting level percentage by selecting a value with switches 65 to 69 in the same manner as described above, the switch 82 being momentarily opened after being closed to free address lines B0 to B8 for changes to be imparted thereto by counter unit 74.

Assuming a defueling simulation is desired, the operator will select a rate such as fifty pounds per second by moving ganged switches 94 and 116 to that setting. The closing of defueling switch 91 enables clock 106 to operate counter unit 94 and enables the down NAND gate 84. This causes the counter unit 74 to count down from the selected starting level and the addresses B0 to B8 for memory unit 40 will change in a corresponding down direction. Each address change will correspond to a fuel gage level which will be calculated and displayed by the UUT in terms of pounds in exactly the same manner as when a fixed fuel level is simulated as referred to above. The simulated fuel level changes on the order of a second or two for each address change of address B0 to B8 whereas the sequential accessing of the probes via multiplexing linea 23 is on the order of milliseconds so each fuel level calculation and display will be updated several times for each fuel level address change via address lines B0 to B8.

A fueling simulation effected by switch 87 is similar to a defueling simulation effected by switch 91 except for (1) the enabling of NAND gate 83 connected to the up counting pin of counter unit 74 and (2) the valve closing delay simulation effected by delay unit 90. As explained above, delay unit 90 operates by delaying both the enabling and disabling of AND gate 139 which connects clock 106 to the fuel rate counter unit 94 after a predetermined time period such as four seconds.

Comparator unit 134 discontinues enabling either of the counting NAND gates 84 or 83 when the counter unit 74 reaches the respective zero or 100 percent level.

We claim:

1. A test unit for a liquid gaging system having probe lines for connection to sensors responsive to the depth of a liquid in a tank at particular locations and a common return line connected to said sensors, said system having means for supplying excitation signals to said probe lines and means for reading said sensors via said common lines return for liquid depth information at each of said sensors, said system having means for processing said information to calculate the liquid fuel volume in said tank; said test unit being connected to said probe lines and said return line in lieu of said sensors, said test unit comprising, storage means for storing characterization parameters simulating said sensors based on tank shape and volume and the location of said sensors in said tank with said parameters representing said depth information over a range of simulated tank fill conditions from zero to full, a reference element connected to said return line, control means for setting desired simulated tank levels, and means for processing said excitation signals via said storage means and said reference element to place current values on said return line which correspond to simulated levels set by said control means.

2. A test unit according to claim 1 wherein said sensors comprise capacitive probes and said reference element is a capacitor.

3. A test unit according to claim 2 wherein said test unit has converter means preceding said reference capacitor, said system having multiplexing means wherein an AC excitation voltage is sequentially directed through said probe lines, said test unit having multiplexing switch means between said probe lines and said converter means, said multiplexing switch means being connected to said system multiplexing means, and said converter means being controlled by said storage means.

4. A test unit according to claim 3 wherein said storage means is an addressable memory unit having a digital output, said converter means being a D/A converter which is controlled by said digital output.

5. A test unit according to claim 4 wherein said memory unit is formatted with a set of look-up tables corresponding respectively to said set of probes, said memory unit having a low order address part connected to said control means for the internal accessing of said tables and a high order address part connected to said system multiplexing means for sequentially and periodically accessing said tables to output to said D/A converter control words addressed by said low order address part in synchronism with said sequential excitation of said probe lines to accordingly attenuate said excitation signals via said D/A converter.

6. A test unit according to claim 5 wherein each of said look-up tables contain capacitance related characterizing words in an address ascending order which correspond to actual probe capacitances at equally ascending incremental fuel levels from empty to full.

7. A test unit according to claim 5 wherein said control means includes switch means for setting said low order address part at a binary value corresponding to a desired fuel tank level simulation.

8. A test unit according to claim 5 wherein said control means includes up/down counter means for sequentially varying said low order address part to effect tank filling and draining simulations.

9. A testing unit for an aircraft fuel gaging system, said system having computer type controller means and a plurality of probes which are mountable in a fuel tank, said plurality of probes including a set of liquid level indicating probes having specific positions in said tank, said system having probe lines connecting said set of probes to said controller means and a common return line connecting said set of probes to said controller means, said system having multiplexing means wherein an AC excitation current is sequentially directed through said probe lines to said set of probes, said system having means for sequentially measuring the magnitudes of the succession of currents returning through said return line in synchronism with said multiplexing means to provide data for fuel volume and weight calculations; said testing unit comprising, a D/A converter, multiplexing switch means between said probe lines and said D/A converter connected to and controlled by said system multiplexing means, a voltage to current element between said D/A converter and said return line, an addressable memory unit for controlling said D/A converter, said memory unit being formatted with a set of look-up tables corresponding respectively to said set of probes, said memory unit having a low order address part for the internal accessing of said tables and a high order address part connected to said system multiplexing means for sequentially and periodically accessing said tables to output to said D/A converter control words addressed by said low order address part in synchronism with said sequential excitation of said probe lines to accordingly attenuate the output of said D/A converter, and control means for selectively altering said low order address part to effect simulations of desired fuel levels.

10. A testing unit for an aircraft fuel gaging system, said system having computer type controller means and a plurality of capacitive type probes which are mountable in a fuel tank, said plurality of probes including a set of liquid level indicating wetted length type capacitive probes having specific positions in said tank and being sized to extend vertically from the floor of said tank to the top there, said system having probe lines connecting said set of probes to said controller means and a common return line connecting said set of probes to said controller means, said system having multiplexing means wherein an AC excitation current is sequentially directed through said probe lines to said set or probes, said system having means for sequentially measuring the magnitudes of the succession of currents returning through said return line in synchronism with said multiplexing means to provide data for fuel volume and weight calculations; said testing unit comprising, a D/A converter, multiplexing switch means between said probe lines and said D/A converter connected to and controlled by said system multiplexing means, a reference capacitor between said D/A converter and said return line, an addressable memory unit for controlling said D/A converter, said memory unit being formatted with a set of look-up tables corresponding respectively to said set of probes, each of said look-up tables containing capacitance related characterizing words in an address ascending order which correspond to actual probe capacitances at equally ascending incremental fuel levels from empty to full, said memory unit having a low order address part for the internal accessing of said tables and a high order address part connected to said system multiplexing means for sequentially and periodically accessing said tables to output to said D/A converter control words addressed by said low order address part in synchronism with sequential excitation of said probe lines to accordingly attenuate the output of said D/A converter, and control means for selectively altering said low order address part to effect simulations of desired fuel levels.

11. A testing unit for an aircraft fuel gaging system, said system having computer type controller means and a plurality of capacitive type probes which are mountable in a fuel tank, said plurality of probes including a set of liquid level indicating wetted length type capacitive probes having specific positions in said tank and being sized to extend vertically from the floor of said tank to the top thereof, said system having probe lines connecting said set of probes to said controller means and a common return line connecting said set of probes to said controller means, said system having multiplexing means wherein an AC excitation current is sequentially directed through said probe lines to said set of probes, said system having means for sequentially measuring the magnitudes of the succession of currents returning through said return line in synchronism with said multiplexing means to provide data for fuel volume and weight calculations, said testing unit being connected to and controlled by said system multiplexing means; said testing unit comprising, a D/A converter, multiplexing switch means between said probe lines and said D/A converter, a reference capacitor between said D/A converter and said return line, an addressable memory unit for controlling said D/A converter, said memory unit being formatted with a set of look-up tables corresponding respectively to said set of probes, each of said look-up tables containing capacitance related characterizing words in an address ascending order which correspond to actual probe capacitances at equally ascending incremental fuel levels from empty to full, said capacitance characterizing words in each of said look-up tables being directly proportional in value to wetted lengths of the characterized probe thereof at the respective incremental fuel levels, said memory unit having a low order address part for the internal accessing of said tables and a high order address part connected to said system multiplexing means for sequentially and periodically accessing said tables to output to said D/A converter control words addressed by said low order address part in synchronism with said sequential excitation of said probe lines to accordingly attenuate the output of said D/A converter and control means for selectively altering said low order address part to effect simulations of desired fuel levels.

12. A testing unit according to claim 11 wherein said control means includes switch means for setting said low order address part at a binary value corresponding to a desired fuel tank level simulation.

13. A testing unit according to claim 11 wherein said control means includes up/down counter means for sequentially varying said low order address part to effect tank filling and draining simulations.

14. A testing unit according to claim 12 wherein said control means includes up/down counter means for sequentially varying said low order address part from said setting value as a starting point to effect tank filling and draining simulations.

15. A testing unit according to claim 13 including rate select means for varying the counting rate of said up/down counter means.

16. A testing unit according to claim 13 wherein said aircraft fuel gaging system includes valve control means for initiating the closing of a fuel valve at a time when a tank being filled by said valve is close to being full, said testing unit including up and down switch means for operating said up/down counter means, time delay means between said up and down switch means and said up/down counter means, said system valve control means being connected to said time delay means to effect control thereof and thereby simulate the closing time of said valve.

17. A testing unit according to claim 11 wherein said set of probes of said system includes a dielectric constant sensor in the form of a capacitive probe which is connected to one of said probe lines, and one of said look-up tables for said dielectric constant sensor having at all low order address thereof a binary word value which represents an assumed dielectric constant.

* * * * *